Feb. 3, 1931.  C. W. FOSSETT  1,790,658
AIRPLANE
Filed May 23, 1928  2 Sheets-Sheet 1
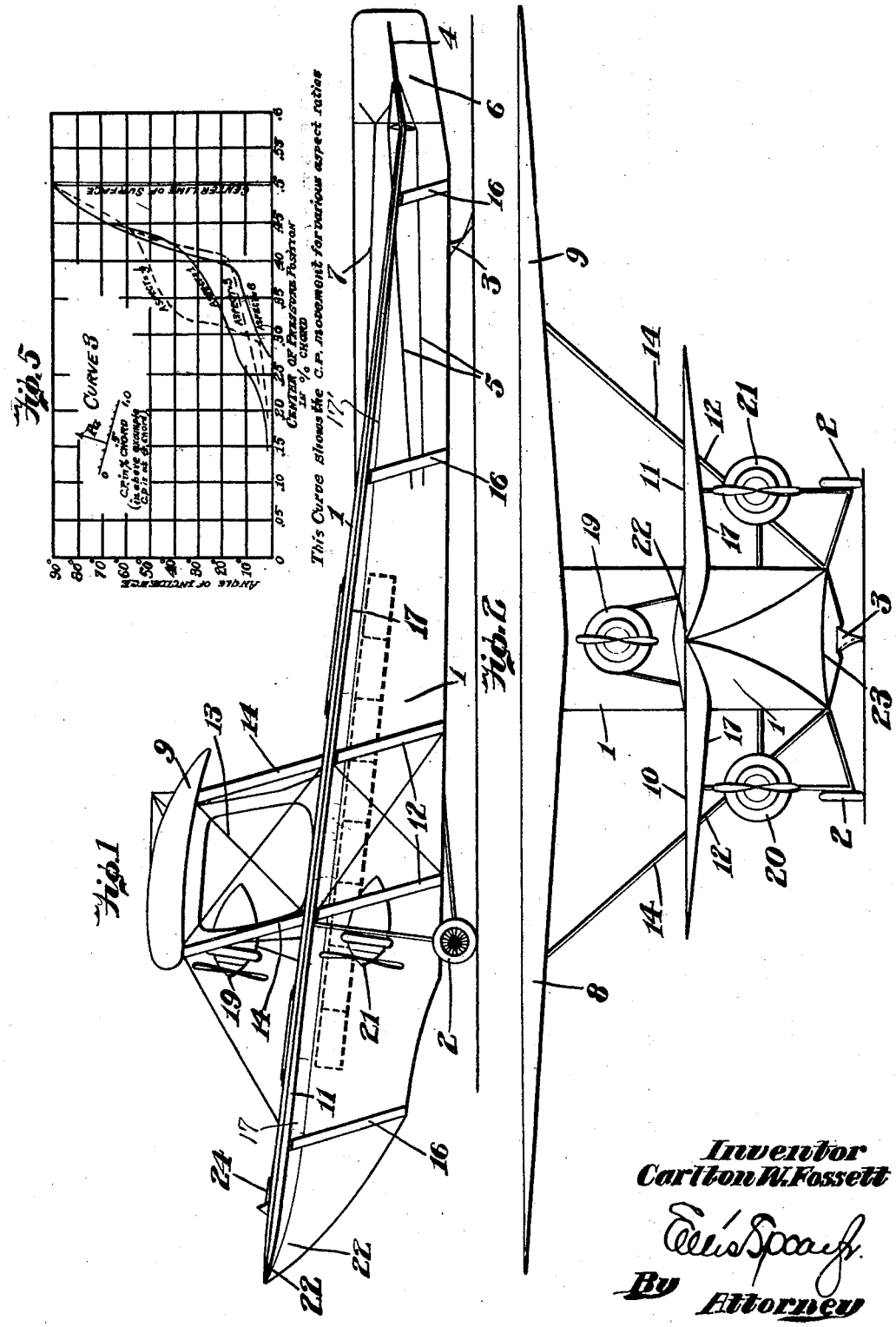
Inventor
Carlton W. Fossett
By Attorney Feb. 3, 1931.        C. W. FOSSETT        1,790,658
AIRPLANE
Filed May 23, 1928        2 Sheets-Sheet 2
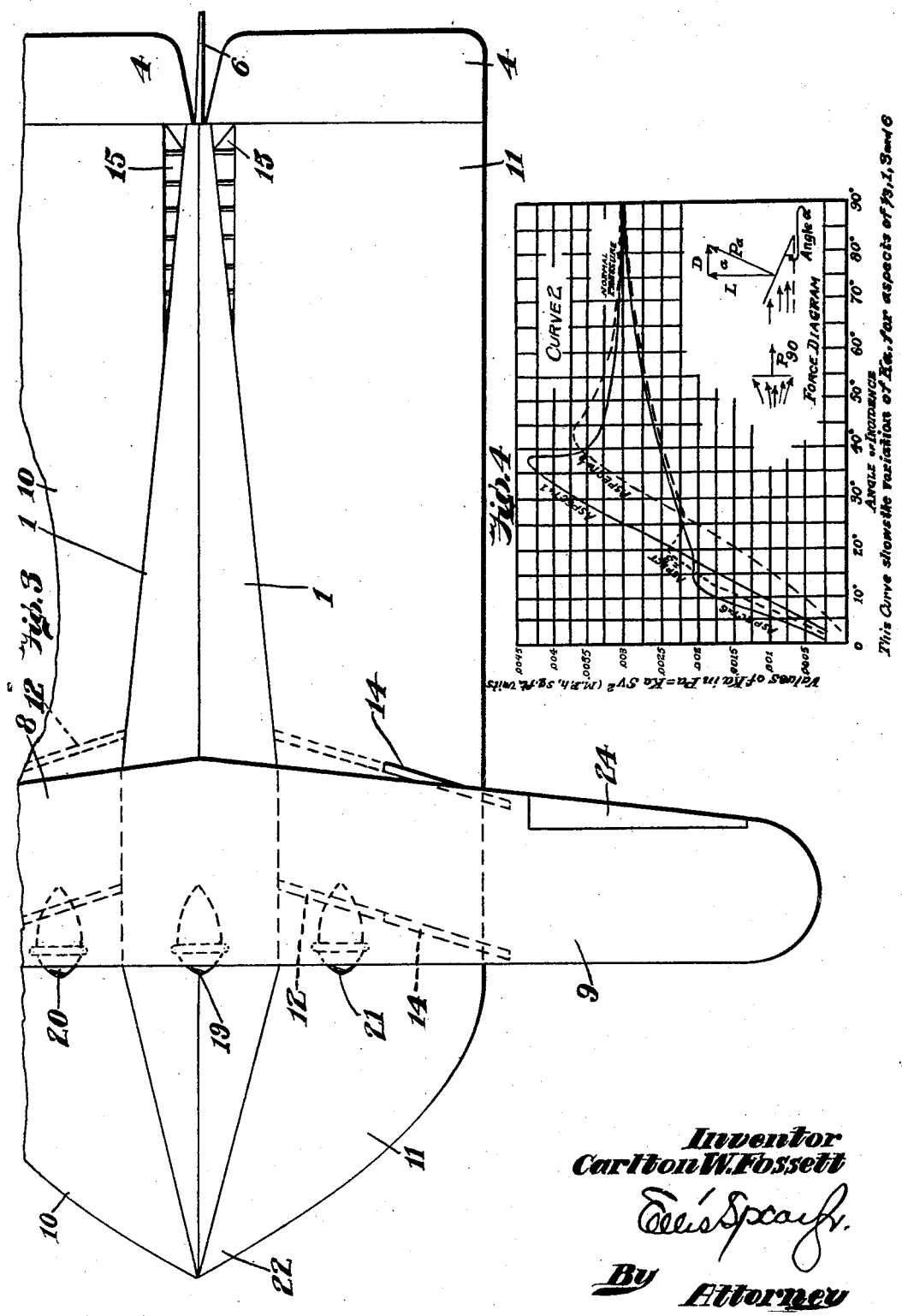
Inventor
Carlton W. Fossett
By Ellis Spragh Jr.
Attorney Patented Feb. 3, 1931

1,790,658

UNITED STATES PATENT OFFICE

CARLETON W. FOSSETT, OF SOUTH BARRE, MASSACHUSETTS

AIRPLANE

Application filed May 23, 1928. Serial No. 280,002.

This invention relates to a heavier than air machine and is applicable to airplanes of either the single motor or multi-motor type.

In the type of airplanes now commonly known and used, the main lifting force is obtained by employing one or more air foils extending transversely of the fuselage of the plane.

In the design of the transversely extending air foils, the greatest dimension of the foil is normal to the direction of travel of the airplane. Air foils having what is known as a relatively large aspect ratio are employed, the aspect ratio being defined as the ratio of the width to the length of the air foil. When the wing or air foil is so disposed as to present the long edge to the wind, it is said to be in pterygoid aspect; when the wing is so disposed that the narrow edge is toward the wind, it is said to be in apteroid aspect. In the planes now commonly employed having the transversely disposed wings, they are in what is above defined as pterygoid aspect and substantially the entire lifting force is obtained from these transversely extending wings.

When it becomes necessary to obtain a greater lifting force to carry heavier loads, the extra lifting force is usually obtained by extending the wings and increasing the aspect ratio thereof. When this is done, it becomes increasingly difficult to provide the necessary struts for strengthening the wings, particularly where they extend transversely to such a great extent.

A further objection to increasing the wing spread transversely of the machine, is that the lateral stability of the plane is affected, in that the wind forces effective at the end of the wings acting about the longitudinal axis of the plane exert a greater tendency to destroy the lateral balance of the machine than the same forces would if acting upon a portion of the wing nearer to the fuselage, of the longitudinal axis of the plane.

A further characteristic of the airplane in which the main lifting force is obtained from the wings in pterygoid aspect is, that in order to maintain a proper longitudinal stability, it is necessary to so arrange the load that it is concentrated well forward of the plane so that the center of gravity of the plane and its load will come at a point well forward of the machine and approximating the point at which the lifting force from the transverse wings passes through the longitudinal axis of the plane. Usually, the center of lifting of an airplane is preferably slightly forward of the center of gravity as such a disposition of the relative centers about which the forces are effective serve to maintain stability of the plane by assisting in maintaining proper angle of incidence of the planes for obtaining the desired lift due to the action of the wind pressure against the plane or wing surfaces.

It is one of the objects of this invention to provide a plane in which the effective lifting surfaces are so disposed as to permit relatively heavy loads to be carried and yet maintain the stability that can be obtained in planes carrying lighter loads.

A further object of the invention is to provide an airplane adapted to carry relatively heavy loads, having great longitudinal and lateral lifting stability and great lifting capacity at the comparatively lower speeds of the plane, without necessitating excessive wing spread.

Increased stability of planes, particularly those carrying the extremely heavy loads, is particularly desirable at the comparatively lower speeds of the plane, inasmuch as the take off and the landing of the plane is greatly facilitated and thus accomplished with increased safety. An airplane having a relatively small wing spread of relatively low aspect ratio, is particularly desirable in commercial, as well as military planes, as such a plane is enabled to take off and land in a more restricted area than a plane having a relatively wide wing spread and having a relatively large aspect ratio.

A further object of this invention is to provide in an airplane, a load carrying plane preferably having a relatively low aspect ratio less than unity, said low aspect ratio plane being disposed adjacent to the fuselage and so arranged relative thereto as to be readily structurally supported therefrom without requiring numerous struts and bracing members distant from the fuselage, to offer resistance to the flight of the plane.

A further object of this invention is to provide in an airplane, in combination with laterally extending wings having an aspect ratio greater than unity, a load supporting and stabilizing wing or plane having a relatively low aspect ratio less than unity in order to increase the lifting coefficient of the plane throughout a wider extent of angles of incidence in which the wing of low aspect ratio will be more effective and efficient than the laterally extending wings of high aspect ratio.

A further object of this invention is to provide an airplane having in combination with a laterally extending wing an aspect ratio greater than unity, of a plane having a relatively small aspect ratio less than unity arranged adjacent to the fuselage in order to utilize the increased lift coefficient over the greater angles of incidence of the plane utilized in climbing in order to obtain altitude in flight.

A further object of this invention is to provide, in combination with a transversely extending plane having a relatively high aspect ratio, a longitudinally extending plane having an aspect ratio less than unity and arranged adjacent to the fuselage for a portion of the length of the low aspect wing, at the forward portion thereof, but being spaced from the fuselage at the rear portion thereof so as to provide an aperture through which the air might be effective upon controls for obtaining the balance and direction control of the plane.

Still a further object of this invention is to provide in an airplane, having a laterally extending wing of a relatively large aspect ratio in which, at relatively small angles of incidence the lifting coefficient is relatively high, a longitudinally extending wing having a relatively low aspect ratio less than unity, and having the lift characteristics of a flat low aspect wing in which the lift coefficient is relatively high, (exceeding those of the high aspect wings), at the larger angles of incidence, above those angles at which the lift coefficient of the high aspect wings is greatest.

A further object is to provide a novel disposition of plane surfaces both laterally and longitudinally of the plane so as to minimize the likelihood of side slipping and tail spin of the plane.

In the accompanying drawings one preferred form of the invention is shown merely for purposes of illustration as it is understood that various changes and modifications may be made within the knowledge of one skilled in the art without departing from the spirit and scope of the invention as defined in the appended claims.

In the drawings:

Fig. 1 is a side elevation of a multi-motored airplane showing a laterally disposed wing in pterygoid aspect, and a longitudinally disposed wing in apteroid aspect extending along the fuselage of the plane.

Fig. 2 is a front elevation.

Fig. 3 is a top plan with one of the laterally disposed wings broken away.

Fig. 4 is a curve or chart showing the relation between the lift coefficient at various angles of incidence for flat surface aerofoils having various aspect ratios for wings in pterygoid aspect of an aspect ratio as high as 6, and a wing in apteroid aspect with an aspect ratio of ⅓.

Fig. 5 is a curve or chart representing the change in position of the effective center of pressure of the lift at various angles for flat surface wings in pterygoid aspect having a ratio as high as 6, and for wings in apteroid aspect having a relatively small aspect ratio of ⅓.

As shown in the drawings, the airplane comprises the fuselage 1 which may be constructed in accordance with ways well known in the art, the detail construction thereof not being here shown as the same forms no part of this invention.

A landing chassis having wheels 2 is shown, which chassis may also be constructed in accordance with any of the well known forms.

It is also understood that if the invention were used in connection with a hydro-plane, suitable pontoons would be employed instead of the wheels.

In order to support the tail or empennage structure of the plane in landing and take off, a tail skid 3 of any of the well known constructions may be employed.

As a portion of the empennage structure the usual elevator 4 together with the control cables 5 therefore, and a rudder 6 together with the control cables 7 therefore may be employed.

The details of the control stock pedal or wheels within the fuselage is not shown as these may be of any of the well known forms of construction.

In the airplanes now commonly used, the necessary lifting force required for sustaining and carrying the weight of the various parts of the plane and any load carried thereby, is obtained by utilizing laterally extending wings in pterygoid aspect having relatively large aspect ratio. In order to obtain increased wing surface, multi-wings are sometimes used by employing additional transversely extending wings, or if the monoplane type is desired, it is necessary to increase the span of the wing, which latter, usually necessitates employing a wing having a larger aspect ratio.

In accordance with this invention, laterally extending wings 8 and 9 arranged in pterygoid aspect are employed. The aspect ratio of such lateral wings would not be as large as in instances where the entire lifting force is obtained by the laterally extending wings. The laterally extending wings 8 and 9 may be constructed in accordance with any of the well known forms of wings, and are supported in the usual manner by spars or struts 12, and bracing members 13 in a manner well known in the art. Preferably, diagonal outboard struts 14 are also employed to give rigidity and stiffness to the projecting plane portions 8, 9, 10, and 11 under the wind pressures in flight. The vertical struts are preferably given a stream line form in order to reduce the head resistance during flight, and, if desired, the diagonally extending struts 14 might be so formed as to obtain effective lift component during flight.

In combination with a laterally extending wing, there are provided longitudinally extending wings or planes 10 and 11 which wings are arranged in apteroid aspect and have a relatively small aspect ratio being less than unity. As shown, the longitudinally extending wings 10 and 11 are arranged adjacent to the fuselage so as to be integral therewith at the forward portion of the fuselage, said longitudinally extending wings being in contact with the fuselage for the greater part of the length thereof. However, at the tail portion of the fuselage, the wings are spaced from the fuselage and from each other, so as to form apertures or openings 15 which create a turbulence in the air which is effective upon the rudder and elevator controls of the plane. As shown in the preferred form, the longitudinal plane extends from a point forward of the transverse plane, rearward along the fuselage to a point adjacent the tail of the plane.

It is understood, however, that in the use of a longitudinally extending plane in apteroid aspect and having a relatively small aspect ratio, that such a plane may be arranged in various ways depending upon the character and disposition of the load required to be carried by the plane. One of the advantages in providing a longitudinally extending plane adjacent the fuselage is that it may be readily constructed to withstand the forces effective thereon during flight, which forces will not be as large as those forces acting upon the outermost parts of a transversely disposed wing. If desired, suitable diagonally disposed struts 16 may be provided for bracing the longitudinally extending wings.

The lower face 17 of the longitudinally extending wing may be arranged at a slight dihedral angle to obtain the lateral stabilizing effect throughout the length of the fuselage.

The effect of a side gust of wind, or the side slip of the plane should not be as abrupt or intense as would be the case where the dihedral angle is used on a transversely extending wing. This difference is accounted from the fact that the forces effective upon the dihedral angle of the transverse plane is acting through a relatively short moment arm about the longitudinal center of thrust of the plane, whereas in the laterally extending wing, the wind pressure acting upon the end of the transverse wing by reason of the dihedral angle thereof, is acting through a moment arm which is much greater in length. However, while the moment arm of the longitudinal wing through which the lateral stabilizing forces are effective, is much shorter, such stabilizing forces will nevertheless be effective, beccause the longitudinal wing will ordinarily extend throughout a great portion of the length of the fuselage.

The lower lifting face 17 of the longitudinally extending wing is preferably cambered and flat so as to have the advantageous characteristics which are inherent in flat aerofoil surfaces and particularly those having a relatively small aspect ratio. The rear portion 17' of the lower lifting face of the longitudinal wing is preferably arranged to have an effective negative angle of incidence and arranged to effect a negative lift as hereinafter set forth.

The curve or chart shown in Fig. 5 represents the position of the center of pressure of flat aerofoils at various angles of incidence, for wings having various aspect ratios ranging from ⅓ to 6. From this curve it appears that the center of pressure for a wing having a relatively small aspect ratio of ⅓, shifts but a small distance throughout a variation of angle of incidence between 10° and 45°. The variation indicated on the chart is but .05 of the cord of the wing, that is from .30 to .35.

It is also noted from the curve, that the center of pressure on the wing of low aspect ratio is nearer the forward edge of the wing than in the case of wings having the larger aspect ratio. This characteristic of a low aspect wing renders a low aspect ratio wing arranged in apteroidal aspect particularly suitable for use in combination with a laterally extending wing which is usually arranged forward of the center of the fuselage.

If desired, the rear portion of the longitudinally extending wing might be disposed at a different angle, relative to the normal angle of incidence of the laterally extending wing, than the angle of the forward portion of the longitudinal wing.

Preferably, the angle of the rear portion 17' of the longitudinal wing is such as to give a negative lift to the tail portion of the longitudinal wing, so as to form, with the transverse wing and the forward portion such an angle as will give the longitudinal stabilizing effect that has been attempted to be obtained by a tandem plane arrangement in which the angle of the main plane and tail plane was arranged in convergent tandem relation. In a convergent tandem relation, the tail plane of the tandem plane is arranged at such an angle as to give what is known as a negative lift, the characteristic of which is that it tends to cause the forward lifting planes to nose up at such an angle of incidence as will cause them to be most effective in sustaining their load.

The curve or chart shown in Fig. 4 represents the variation between the lift coefficient represented by $Ka$ for flat airofoils of varying ratio aspects, throughout the various angles of incidence. An examination of the curve discloses that an airofoil or wing arranged in apteroid aspect, and having an aspect ratio of $\frac{1}{3}$, is more efficient, in that the coefficient of lift $Ka$ is greater, particularly throughout the angles of incidence of from 25° to 45°, than the wings arranged in pterygoid aspect and having a relatively high aspect ratio. It is to be noted that at 45°, the coefficient of lift for the airofoil having an aspect ratio of $\frac{1}{3}$ is even greater than the lift coefficient of the wings having the relatively large aspect ratios, greater than unity, when such large aspect ratio wings are at an angle of incidence of 90°. By reason of such characteristics and properties of the longitudinal wing in apteroid aspect, it is well suited in combination with the lateral wings in pterygoid aspect, effecting lateral stability for sustaining heavy loads and for facilitating starting, rapid climbing and landing at relatively slower speeds. The slower speed in landing is an important and prime factor contributing towards greater safety. The safety factor is of utmost importance in aviation in effecting the starting and landing of heavy loads.

On the other hand, it is to be noted that throughout the lower angles of incidence, as for example, from 0° to 15° for the wings having the relatively large aspect ratio, that while the coefficient of lift is not as great as the maximum coefficient of lift of the low aspect wing at the larger angles, nevertheless, the coefficient of lift of such relatively large aspect ratio wings is greater than the coefficient of lift of the wing having the low aspect ratio.

It is the purpose of the present invention to so proportion and arrange the surfaces and angles of the transversely extending relatively high aspect ratio wing, in combination with a longitudinally relatively low aspect ratio wing arranged in apteroid aspect, that the most desirable lifting and stabilizing characteristics of each of the two types of wings may be most effectively utilized. To this end, it will undoubtedly be necessary to have a decalage relation in which the angle of incidence of the laterally extending plane will be different, preferably less, than the angle of incidence of the lower and longitudinally extending plane so that the difference in the angle of incidence of the upper transverse and the lower longitudinal wing might be termed a minus decalage.

As previously mentioned, the airplane may be driven by either a single motor, or a plurality of motors. It is, of course, understood that if a plurality of motors are employed, they may be so disposed that the resultant line of thrust passes approximately through the center of gravity and the center of resistance caused by the head resistance of the part, and the drag component of the various plane surfaces. In the drawing three motors 19, 20, and 21 are shown. These motors may be supported by suitable strut and truss construction.

The nose 22 of the plane is preferably so formed as to reduce the head resistance.

Preferably, the bottom portion 23 of the fuselage is slightly arched so as to present a slight concavity and might be said to simulate a cata-hedral arrangement of the lower wings of a bi-plane wherein the wing tips are lower than the center portion and form what might be termed a negative dihedral. Such a formation of the bottom contour would serve to increase the lift thereof.

The usual ailerons 24 together with the suitable control cables thereof, are provided at the trailing edge of the transversely extending wing in order to obtain lateral control of the plane in the manner well known in the art.

The provision of the longitudinally extending wing, in combination with the transverse wing, will enable the load carried by the plane to be distributed throughout a greater longitudinal extent of the plane, than has heretofore been possible where only the transversely extending plane or planes are used.

A further advantage of the transversely extending planes particularly at the tail portion of the fuselage, is that it will tend to prevent the airplane going into a tail spin which is caused by the rotation of the tail of the plane about a vertical axis passing through the center of gravity of the plane.

What I therefore claim and desire to secure by Letters Patent is:

1. An airplane comprising in combination, a fuselage, laterally extending wings having relatively high aspect ratio, and longitudinally extending wings having relatively low aspect ratio less than unity arranged adjacent to the fuselage at the forward portion theerof, the rear portions of said low aspect wings being spaced from each other and from the fuselage to form a turbulence in the air, and controls to the rear of said spaced portion of the longitudinal wing effected by the turbulence.

2. An airplane comprising in combination a fuselage having a concave bottom portion extending longitudinally thereto, wings in pterygoid aspect extending laterally of and spaced above the fuselage said wing having a relatively large aspect ratio and wings in apteroid aspect, arranged one on each side of the fuselage and extending longitudinally along the upper edge thereof from a point forward of the wings in pterygoid aspect, to a point rearwardly thereof, and common struts for supporting the wings in apteroid and pterygoid aspect, said struts passing through the longitudinal wing and terminating in the lateral wing intermediate its length.

3. An airplane comprising in combination, laterally extending wings having a relatively high aspect ratio and arranged in pterygoidal aspect, a fuselage, longitudinally extending wings having a relatively low aspect ratio less than unity and arranged in apteroidal aspect and extending from a point forward of the laterally extending wings rearwardly along the fuselage, the forward portion of the longitudinally extending wings being connected with and extending along the upper edge of the fuselage and the rearward portion of the longitudinal wings being spaced from the fuselage and from each other to form an aperture through which turbulence is effective and controls including rudder and elevator arranged to the rear of said spaced portion of the longitudinal wing whereby said controls are subjected to the turbulence created immediately forward thereof.

In testimony whereof I affix my signature.

CARLETON W. FOSSETT.